United States Patent
Blume

(10) Patent No.: US 9,278,721 B2
(45) Date of Patent: Mar. 8, 2016

(54) SYSTEM FOR HOLDING IN-LINE TWO WHEELED VEHICLES

(71) Applicant: Ernst Blume, Munster (DE)

(72) Inventor: Ernst Blume, Munster (DE)

(*) Notice: Subject to any disclaimer, the term of this patent is extended or adjusted under 35 U.S.C. 154(b) by 232 days.

(21) Appl. No.: 13/934,326

(22) Filed: Jul. 3, 2013

(65) Prior Publication Data
US 2015/0008197 A1 Jan. 8, 2015

(51) Int. Cl.
*B62H 3/08* (2006.01)
*B62H 3/04* (2006.01)

(52) U.S. Cl.
CPC ... *B62H 3/08* (2013.01); *B62H 3/04* (2013.01)

(58) Field of Classification Search
CPC .............. B62H 3/12; B62H 3/04; B62H 3/08; B62H 3/02; B62H 3/10
USPC ...................................... 211/17–24
See application file for complete search history.

(56) References Cited

U.S. PATENT DOCUMENTS

| | | | | |
|---|---|---|---|---|
| 3,872,972 A * | 3/1975 | Cummins et al. | ............... | 211/17 |
| 3,976,200 A * | 8/1976 | Munns | ............... | 211/18 |
| 5,474,189 A * | 12/1995 | Peterson | ............... | 211/18 |
| 6,237,781 B1 * | 5/2001 | Dahl | ............... | 211/17 |
| 6,336,562 B1 * | 1/2002 | Mori | ............... | 211/20 |
| 6,637,602 B2 * | 10/2003 | Dueck | ............... | 211/17 |
| 7,481,027 B2 * | 1/2009 | Blume | ............... | 52/79.1 |
| 7,784,622 B2 * | 8/2010 | Bernard | ............... | 211/20 |
| 7,946,432 B1 * | 5/2011 | Swanson et al. | ............... | 211/20 |

FOREIGN PATENT DOCUMENTS

| | | | |
|---|---|---|---|
| DE | 10032594 A1 * | 1/2002 | |
| FR | 2958256 * | 10/2011 | |
| WO | WO 2006042459 A1 * | 4/2006 | |

* cited by examiner

*Primary Examiner* — Patrick Hawn

(57) ABSTRACT

The system for holding a number of in-line two wheeled vehicles has a vertical support column. A lifting bracket has an end that engages a vertical channel of the vertical support. A counter balance system in the vertical support column is connected to the lifting bracket. A horizontal track runs perpendicular to a face of the vertical support column with the vertical channel. A horizontal bracket engages the horizontal track. A bike or other two wheel vehicle is held by the lifting bracket. Because the lifting bracket has a counter balance system a person can easily lift the bike up in the air. The horizontal bracket can also hold a bike. A bike on the horizontal bracket can be slid so that it is under the lifting bracket, which may be holding a second bike.

2 Claims, 5 Drawing Sheets

SYSTEM FOR HOLDING IN-LINE TWO WHEELED VEHICLES

RELATED APPLICATIONS

None

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

The storage of bicycles, mopeds, scooters and other in-line two wheeled vehicles can be awkward. A number of bike racks have been proposed, but most only allow for storage at one level. These can be very inefficient. There are some designs for hanging bikes from a ceiling, but these only work inside a building and require a person lift the bike high in the air. Many people do not have the strength and balance necessary to accomplish this. Other systems have been proposed for multiple levels of storage of in-line two wheeled vehicles, but all require some strength and dexterity.

Thus there exists a need for a system for holding in-line two wheeled vehicles that is efficient and easy to use.

BRIEF SUMMARY OF INVENTION

A system for holding a number of in-line two wheeled vehicles that overcomes these and other problems has a vertical support column. A lifting bracket has an end that engages a vertical channel of the vertical support column. A counter balance system in the vertical support column is connected to the lifting bracket. A horizontal track runs perpendicular to a face of the vertical support column with the vertical channel. A horizontal bracket engages the horizontal track. A bike or other two wheel vehicle is held by the lifting bracket. Because the lifting bracket has a counter balance system a person can easily lift the bike up in the air. The horizontal bracket can also hold a bike. The bike on the horizontal bracket can be slid so that it is under the lifting bracket, which may be holding a second bike. Thus the system provides an efficient system for storing bikes and other two wheeled vehicles and does not require significant strength or dexterity.

DETAILED DESCRIPTION OF THE INVENTION

The invention is directed to a system for holding a number of in-line two wheeled vehicles that has a vertical support column. A lifting bracket has an end that engages a vertical channel of the vertical support column. A counter balance system in the vertical support column is connected to the lifting bracket. A horizontal track runs perpendicular to a face of the vertical support column with the vertical channel. A horizontal bracket engages the horizontal track. A bike or other two wheel vehicle is held by the lifting bracket. Because the lifting bracket has a counter balance system a person can easily lift the bike up in the air. The horizontal bracket can also hold a bike. The bike on the horizontal bracket can be slid so that it is under the lifting bracket, which may be holding a second bike. Thus the system provides an efficient system for storing bikes and other two wheeled vehicles and does not require significant strength or dexterity.

Figure 1:
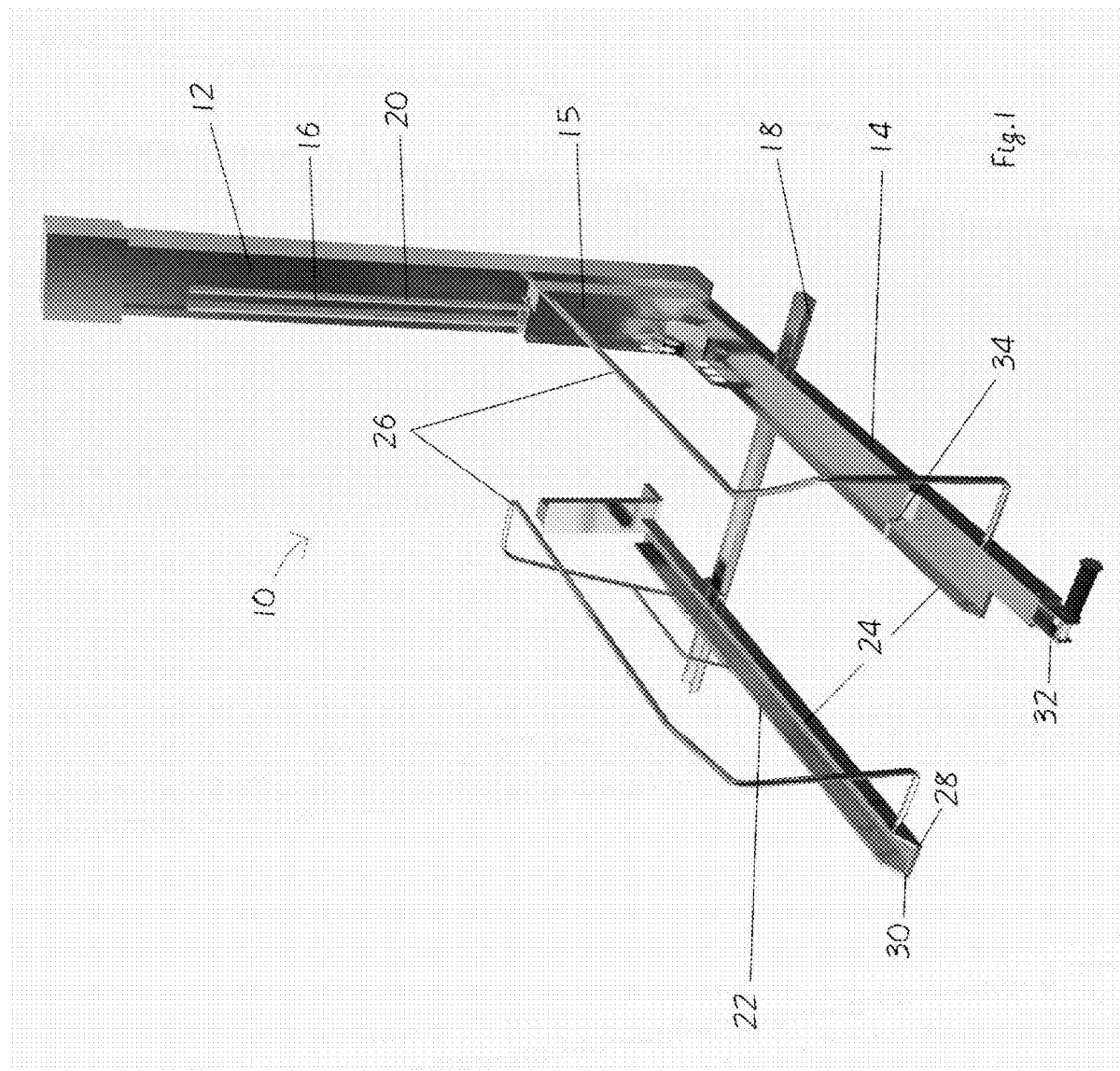
FIG. 1 is a top left perspective view of a system for holding in-line two wheeled vehicles in accordance with one embodiment of the invention.

FIG. 1 is a top left perspective view of a system 10 for holding in-line two wheeled vehicles in accordance with one embodiment of the invention. The system 10 has a vertical support column 12. A lifting bracket 14 has an end 15 that engages a vertical channel 16 in the vertical support column 12. A horizontal track 18 runs perpendicular to the face 20 of the vertical support column 12 that contains the vertical channel 16. A horizontal bracket 22 runs along the horizontal track 18. Both the lifting bracket 14 and the horizontal bracket 22 have a support channel 24. The support channel 24 engages a tire of a bike or other two-wheeled vehicle. Both the lifting bracket 14 and the horizontal bracket 22 have a brace 26 that holds a bicycle upright and in place. The horizontal bike bracket 22 has a wheel 28 at a first end 30. The lifting bracket 14 has a hand lever 32.

Figure 2:
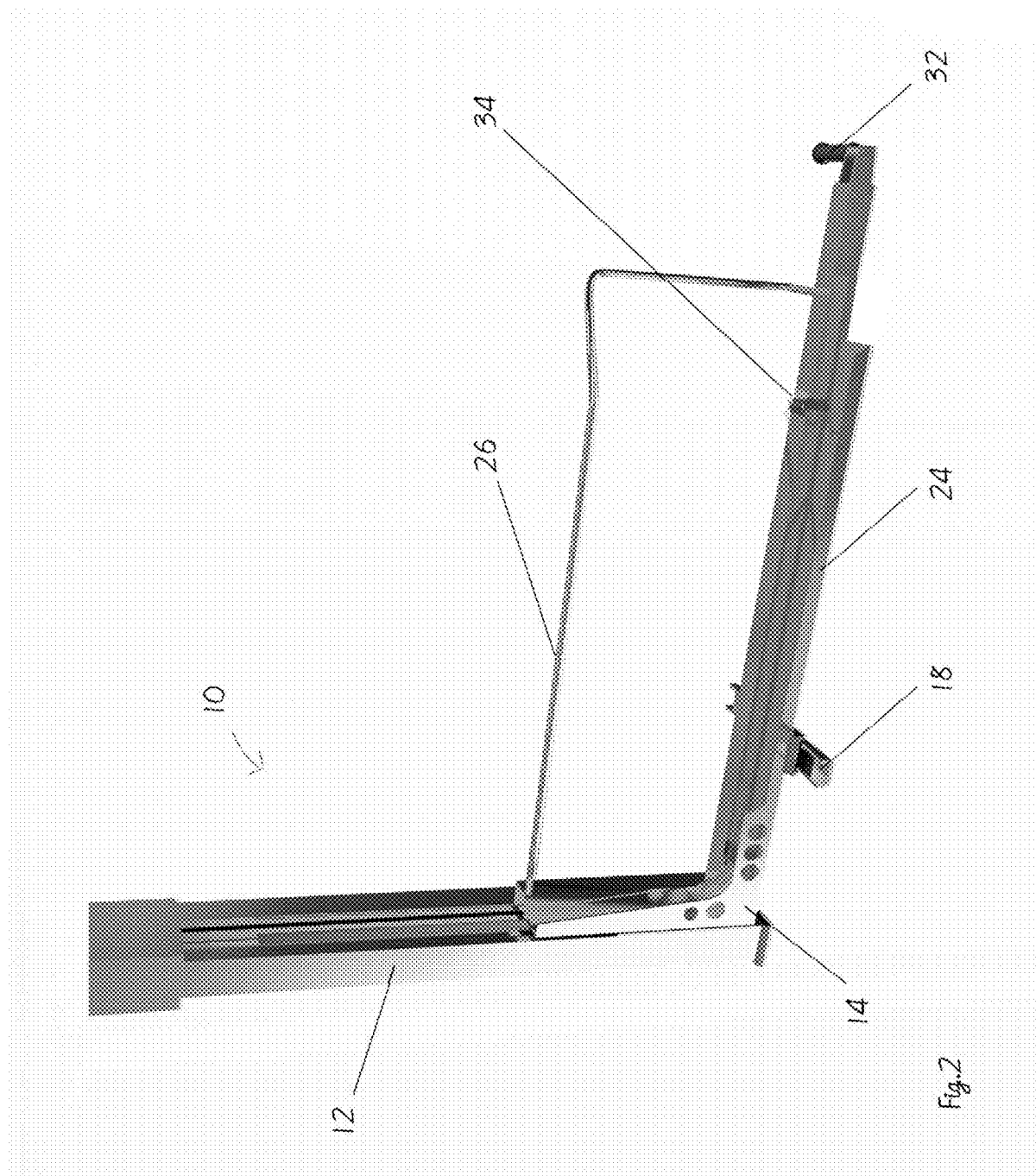
FIG. 2 is a side view of a system for holding in-line two wheeled vehicles in accordance with one embodiment of the invention.

FIG. 2 is a side view of a system 10 for holding in-line two wheeled vehicles in accordance with one embodiment of the invention. This view shows the system 10 with just the lifting bracket 14. In one embodiment, the lifting bracket 14 has an operating lever 34. The operating lever 34 is used to lock the lifting table 14 in the lower position as shown in this figure or in a raised position. In another embodiment, the hand lever 32 serves the dual function of a handle for lifting and lowering the lifting bracket 14 and as the operating lever.

Figure 3:
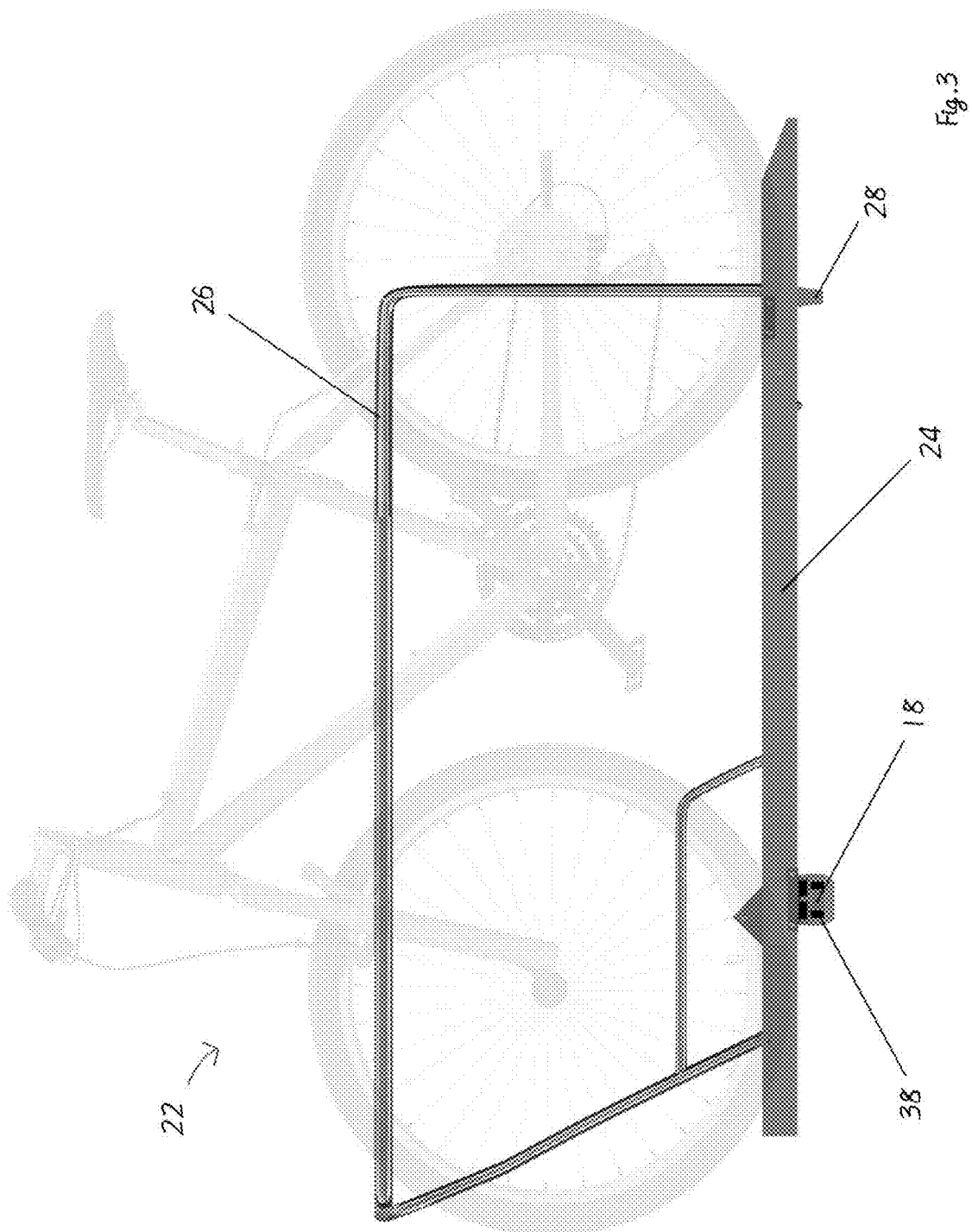
FIG. 3 is a side view of a horizontal bracket in accordance with one embodiment of the invention.

FIG. 3 is a side view of a horizontal bracket 22 in accordance with one embodiment of the invention. A bicycle 36 is shown on the horizontal bracket 22. This figure shows how the horizontal bracket 22 engages the horizontal track 18. A roller mechanism 38 secures the bracket 22 to the track 18 and allows the bracket 22 to glide on the track 18. The wheel 28 works with the roller mechanism 38 to allow the easy movement of the bracket while holding a bike. Note that a similar roller mechanism may be used with the lifting bracket 14 and the vertical track 16.

Figure 4:
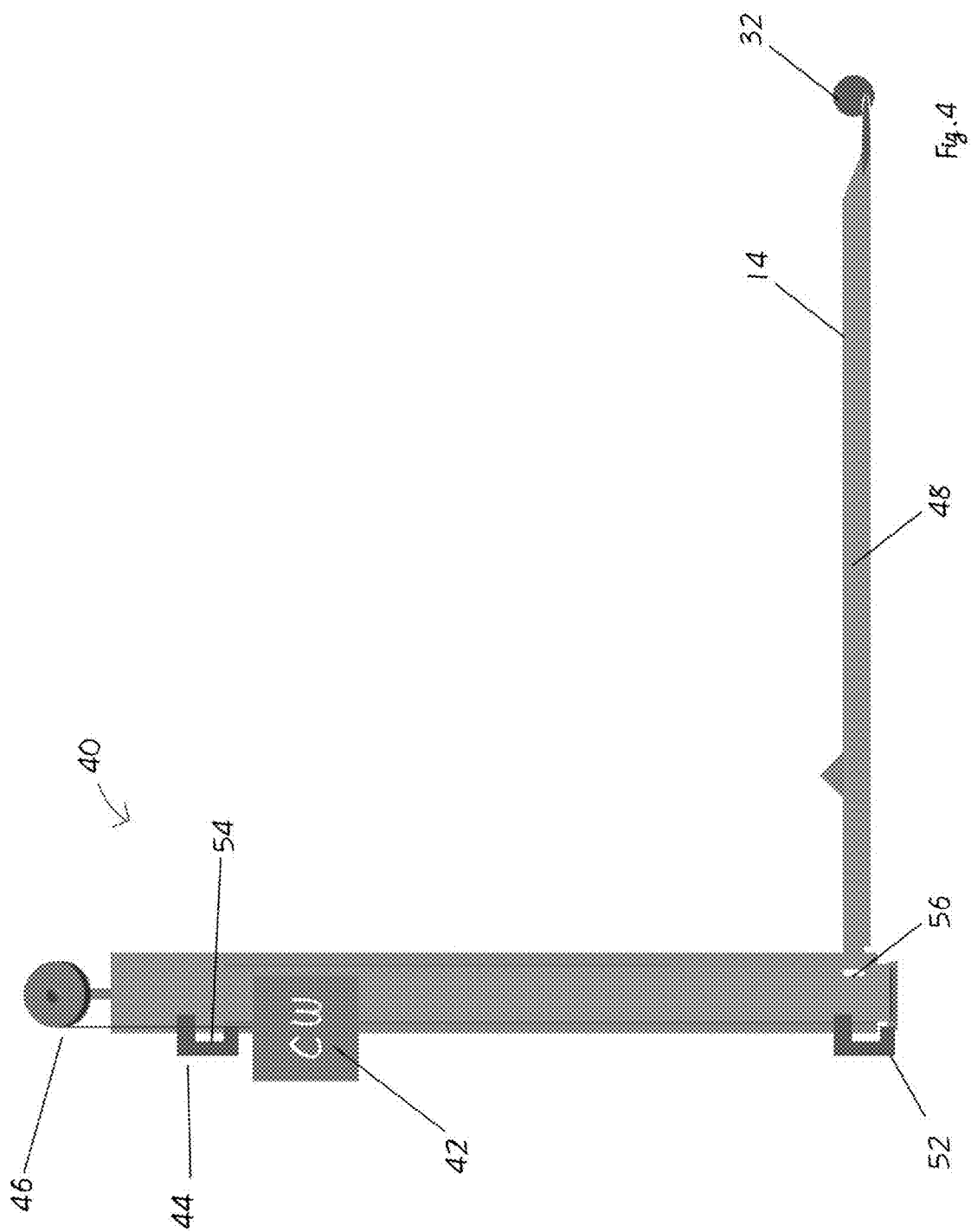
FIG. 4 is a schematic view of a counter balance system in accordance with one embodiment of the invention.

FIG. 4 is a schematic view of a counter balance system 40 in accordance with one embodiment of the invention. A counter weight 42 is disposed inside the vertical support column 12. A cable 44 connects the counter weight 42 over a pulley 46 to the lifting bracket 14. Note in one embodiment, multiple pulleys may be used to connect the counter weight 42 to the lifting bracket 14. The invention is not limited to any particular lift assist mechanism, for example hydraulics or springs may be used and still be within the scope of the invention. Note that the handle 32 is connected to an engaging rod 48 that runs inside the lifting bracket 14. The engaging rod 48 has an end 50 that may engage a ledge 52 to hold the bracket 14 in a lower position. Another ledge 54 is used to hold the lifting bracket 14 in a raised position. Note that other locking or braking mechanisms may be used and still be within the scope of the invention, including a pulley lock or brake.

Figure 5:
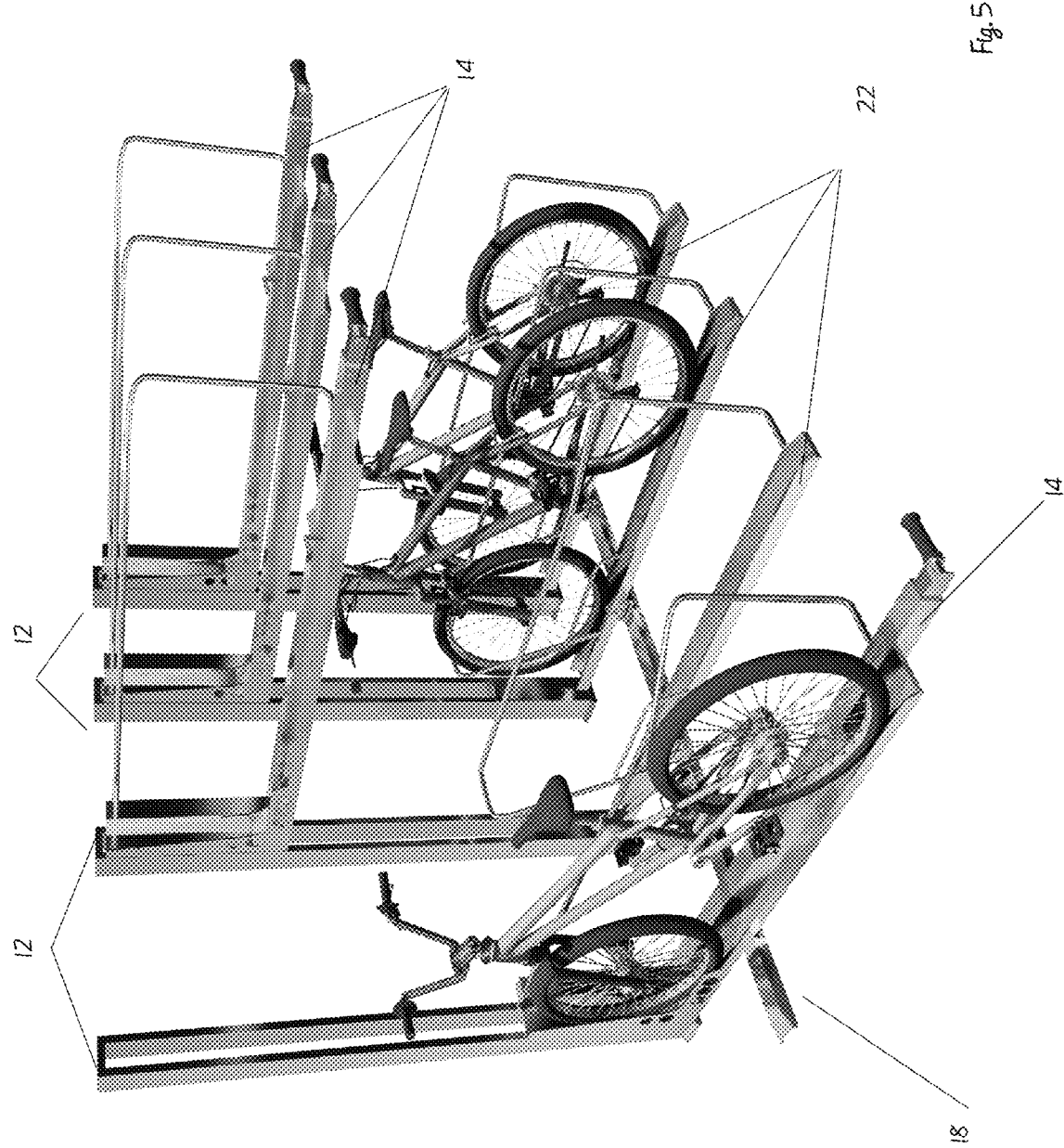
FIG. 5 is a top left perspective view of a system for holding bicycles in accordance with one embodiment of the invention.

FIG. 5 is a top left perspective view of a system for holding bicycles in accordance with one embodiment of the invention. This figure shows multiple vertical brackets 12 aligned in front of a horizontal track 18. When arranged in this manner the system includes multiple lifting brackets 14 and multiple horizontal brackets 22. It shows that multiple bikes can be stack on top of each other.

Thus there has been described a storage system for bicycles that is easy to use and efficiently stores bikes and other two wheeled vehicles. The lifting bracket has a counter balance system that allows a person to easily lift a bike up in the air. The horizontal bracket can also hold a bike. A bike on the horizontal bracket can be slid so that it is under the lifting bracket, which may be holding a second bike. Thus the system provides an efficient system for storing bikes and other two wheeled vehicles and does not require significant strength or dexterity.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A system for holding an in-line two wheeled vehicles, comprising:
   a vertical support column;
   a lifting bracket having an end engaging a vertical channel of the vertical support wherein the lifting bracket holds an in-line two wheeled vehicle in a horizontal position wherein a hand lever is connected to an end of the lifting bracket and the hand lever is connected to a locking rod that engages a locking ledge;
   a support channel in the lifting bracket;
   a counter weight pulley system in the vertical support column connected to the lifting bike bracket;
   a horizontal track running perpendicular to a face of the vertical support column having the vertical channel;
   a horizontal bracket engaging the horizontal track;
   wherein the support channel has a width designed for a bicycle tire;
   wherein the lifting bracket has a lower position and a raised position.

2. The system of claim 1, wherein the support channel has a width designed for a motorcycle tire.

* * * * *